United States Patent
Nam

(10) Patent No.: US 7,463,299 B2
(45) Date of Patent: Dec. 9, 2008

(54) CCD IMAGING DEVICE AND DRIVING METHOD FOR PROCESSING IMAGE DATA WITHOUT FRAME MEMORY BUFFER

(75) Inventor: Jung-Hyun Nam, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 766 days.

(21) Appl. No.: 10/995,398

(22) Filed: Nov. 23, 2004

(65) Prior Publication Data

US 2005/0140807 A1  Jun. 30, 2005

(30) Foreign Application Priority Data

Dec. 30, 2003  (KR) .............. 10-2003-0100643

(51) Int. Cl.
*H04N 3/14* (2006.01)
*H04N 5/335* (2006.01)

(52) U.S. Cl. .............. 348/317; 348/311; 348/320; 348/322; 348/324

(58) Field of Classification Search ............ 348/311, 348/312, 317, 320, 322, 324
See application file for complete search history.

(56) References Cited

U.S. PATENT DOCUMENTS 4,330,796 A * 5/1982 Anagnostopoulos et al. ............ 348/322
4,821,088 A * 4/1989 Tabei et al. ............ 348/280
7,002,629 B2 * 2/2006 Flynn ............ 348/312
2002/0057349 A1 * 5/2002 Yamaguchi et al. ......... 348/222

FOREIGN PATENT DOCUMENTS

| JP | 00-32349 | 1/2000 |
| JP | 00-106653 | 4/2000 |
| JP | 00-295530 | 10/2000 |
| JP | 03-009002 | 1/2003 |
| KR | 1993-0001444 | 1/1993 |

* cited by examiner

*Primary Examiner*—David Ometz
*Assistant Examiner*—Wanda M Negron
(74) *Attorney, Agent, or Firm*—F. Chau & Assoc., LLC

(57) ABSTRACT

A CCD-based solid state image sensing (imaging) device and a driving method, enabling three-color still or video image signal charge processing without requiring a frame memory buffer. By using horizontal electrodes to selectively assert predetermined vertical-driving signals of the vertical CCDs, the vertical CCDs receive and vertically transmit the image signals (charges) of active pairs of vertically adjacent rows. Each active pair of adjacent rows is separated by (at least) two (a pair of) inactive adjacent rows, and the image signal (charges) of the active pair of adjacent rows represent all three colors (R, G, B) of one line (or one field) of real-image pixels. A horizontal CCD receives the selected image signals (charges) for each active row among the active pairs of rows, and outputs the image signals (charges) for each active row by conventional horizontal transmission to an interpolator adapted to continuously output three-color pixel signals (e.g., digital signals), e.g., for driving a digital display apparatus, without requiring a full-frame memory buffer.

23 Claims, 13 Drawing Sheets

US 7,463,299 B2

CCD IMAGING DEVICE AND DRIVING METHOD FOR PROCESSING IMAGE DATA WITHOUT FRAME MEMORY BUFFER

This application claims the priority of Korean Patent Application No. 2003-100643, filed on Dec. 30, 2003, in the Korean Intellectual Property Office, the disclosure of which is incorporated herein in its entirety by reference.

BACKGROUND OF THE INVENTION

1. Field of the Invention

The present invention relates to a solid state image sensing device, and more particularly, to a charge coupled device (CCD) type solid state image sensing device.

2. Description of the Related Art

A charge-coupled device (CCD) is a semiconductor device that converts light into electronic bits of information. In essence, it is digital film. Charge-Coupled Device (CCD) based solid state imaging devices are commonly used in digital still cameras, mobile phone cameras and optical scanners, as well as in photocopiers, fax machines, and more recently, in digital video cameras, to capture images. CCDs are also widely used as sensors for astronomical telescopes, and night vision devices. A charge-coupled device (CCD), is an integrated circuit containing an array of linked, or coupled, capacitors. Under the control of an external circuit, each capacitor can transfer its electric charge to one or other of its neighbors.

A CCD may operate as an optical transducer, a sensor with an electrical output that ideally is proportional to the intensity of illumination on the sensor itself. A CCD senses the intensity of light from a real image focused onto its pixel elements, converts the light into electric charges (signals) proportional to the intensity of the light, and transmits the signals to other devices, such as a memory, a printer, or to a display. A display driving apparatus receiving the signals from a CCD processes signals of color image data (R, G, and B) output from the solid state CCD device and drives a display apparatus such as a liquid crystal display (LCD).

FIG. 1 is a block diagram of a color image sensing system employing a conventional CCD based solid state imaging device. Referring to FIG. 1, a conventional color image sensing system comprises a CCD based solid state image sensing device 110, a frame memory buffer 120, an interpolator 130, and a color signal processing unit 140. The CCD based solid state image sensing device 110 outputs R, G, R, G, . . . , as first phase signals, and outputs G, B, G, B, . . . , as second phase signals. A full frame is composed of the interlaced combination of the first and second phase signals. The charge from each phase of the imaging CCD is transferred to another CCD array called the frame storage array (frame memory buffer). When full frame signals are output in this manner, both of the two phases of two-color signals are stored in the frame memory buffer 120 and then, (R, G) row signals and (G, B) row signals are output alternately by the frame memory. If the three-color signals (R, G, and B) are thus output in each predetermined (frame) period, the interpolator 130 performs interpolation of the three-color signals (R, G, and B), and the interpolated three-color signals (R, G, and B) of each frame are output to a display apparatus, through the signal processing unit 140.

FIG. 2 is a diagram showing the pixel structure of the CCD-based solid state image sensing device 110 of FIG. 1. The CCD-based solid state image sensing device 110 is driven by "Interline Transfer" method, where CCD itself has a electronic shutter. That means the CCD shifts each pixel (photodiode charge) into shift registers (vertical CCDs). These CCDs don't require a mechanical shutter, because can be controlled with electronics around each photodiode. The light is amplified with micro lenses.

The Interline Transfer CCD has the pixel structure shown in FIG. 2 including a two-dimensional photodiode matrix 260 and a vertical CCD connected to each of photodiodes 260. The pixels of the matrix work initially as light detectors then as shift register during charge transfer. The horizontal CCD works only as a shift register. Typically, in the case of a color CCD-based solid state image sensing device 110, a color filter is installed on the top of each pixel element so that light of only a predetermined color (e.g., one of G, B, or R) can be sensed (received). In order to form three-color signals, at least 3 types of color filters are disposed over the matrix of photodiodes 260. A most widely used color filter array is Bayer pattern, which is shown in FIG. 2. Two-color patterns of red (R) and green (G) are disposed in one row; and two-color patterns of green (G) and blue (B) are disposed in the other (alternate) row and these alternating two-color pattern rows are repeated. Each square of four pixels has one filtered red, one blue, and two green pixels. The color green (G) is closely related to a luminance signal and is therefore present in all rows; and the colors red (R) and blue (B) are disposed diagonally to maximize luminance resolution. Current digital still cameras, including CCD based solid state image sensing devices with millions of pixels (Megapixels) have achieved resolutions even higher than the effective resolution of consumer-grade 35 millimeter photographic film. Digital microscope cameras based on CCDs can capture extremely high resolution images, e.g., equivalent to 12.5 million pixels.

The conventional CCD-based solid state image sensing device 110 is designed to employ an interlaced pixel method, and each vertical CCD 250 employs a four-state driving signal (V1~V4) method. During one phase, one of two pixels adjacent to each other in the vertical direction can transfer a signal charge to the CCD 250. The output signals of photodiodes 260 in all rows are not output at the same time and a method by which signals of every-other row of the photodiodes 260 is transmitted to the vertical CCD 250 during each phase, is used.

FIG. 3 is a flowchart explaining the steps in the operation of the CCD-based solid state image sensing device 110 of FIG. 2, and FIGS. 4a and 4b are diagrams to help explain of the operation of the CCD-based sold state image sensing device of FIG. 2. Referring to FIG. 3, in first step S310, the mechanical shutter is opened so that signal charges are accumulated in the photodiodes 260 for a predetermined time interval. Next, in step S320, if an active signal for readout is applied to a driving electrode 210 transferring V1 among the vertical driving signals, the video signals of predetermined rows (e.g., R, G rows) are transferred from the photodiodes 260 to the vertical CCD 250, and V1 charge packet thus transferred to the vertical CCD 250 is vertically transmitted by vertical driving signals (V1~V4) in the vertical CCD (VCCD) 250 towards the horizontal CCD 270 (FIG. 4A). In step S330, the horizontal CCD (HCCD) 270 receives V1 charge packet, and horizontally transmits it by horizontal driving signals (VH1 and VH2) such that video signals of (R and G) rows are output. Likewise, in step S340, if in the next field phase (period), an active signal for readout is applied to the driving electrode 230 transferring V3 among vertical driving signals, and signals of predetermined rows (G, B rows) are transferred from the photodiodes 260 to the vertical CCD 250, and V3 charge packet thus transferred to the vertical CCD 250 is vertically transmitted in the vertical CCD 250 by vertical driving signals (V1~V4) towards the horizontal CCD 270. In step S350, the horizontal CCD 270 receives V3 charge packet ((G, B) row signal packet in FIG. 4a), and horizontally transmits by horizontal driving signals (VH1 and VH2) such that the video signals of (G, B) rows are output.

When the conventional CCD-based solid state image sensing device 110 outputs image signals of one frame in this method, an (R, G) row signal is output in the first phase (period), and a (G, B) row signal is output in the second phase (period). Accordingly, in order for the interpolator 120 to perform interpolation (to reproduce clear color signals), the frame memory buffer 120 is required. Thus, in order to output the three-color signals (R, G, and B) required by the interpolator 120, the frame memory buffer 120 stores one frame composed of signals formed by combining the first and second phase image signals output from the solid state image sensing device 110, and then outputs three-color signals (R, G, and B). Accordingly, in a color image sensing system employing this conventional CCD-based solid state image sensing device 110 and the method driving the device 110, a large capacity of memory is required, which consumes electrical power and takes up space, and it is disadvantageous or uneconomical for small-sized systems for mobile use, such as digital still cameras.

SUMMARY OF THE INVENTION

The present invention provides a CCD-based solid state image sensing device that outputs complementary image signal packets (charges from vertically adjacent rows of Bayer color filtered photodiodes) so that three-color image signal processing can be performed without a frame memory buffer.

According to an aspect of the present invention, there is provided an imaging device comprising: a plurality of photodiodes for converting received light into electric charges and being arranged in a 2-dimensional matrix including a first row, a second row, a third row and a fourth row of photodiodes, wherein the first row of photodiodes is adjacent to the second row of photodiodes, and wherein the third row of photodiodes is adjacent to the fourth row of photodiodes; and a plurality of (vertical) charge coupled devices (VCCDs) for receiving charges from the first pair of adjacent rows of photodiodes, and for vertically transmitting the charges received from the first pair of adjacent rows of photodiodes at the same time during a first field phase. During a second field phase the plurality of (vertical) charge coupled devices (VCCDs) will receive charges from a second pair of adjacent rows of photodiodes, and will vertically transmit the charges received from the second pair of adjacent rows of photodiodes.

The present invention also provides a method for driving the disclosed CCD based solid state image sensing device.

According to an aspect of the present invention, there is provided a CCD based image sensing (imaging) device comprising photodiodes, vertical charge coupled devices (CCD), and a horizontal CCDs. The photodiodes are disposed in a 2-dimensional matrix, each photodiode sensing the intensity of a selected color of light, converting the light into an electric signal, and generating a signal. By using vertical-driving electrodes that receive and transmit vertical driving signals, the vertical CCDs receive image signals (charges) from pairs of adjacent rows of photodiodes, and vertically transmits the image signals. Horizontal-driving electrodes receive and transmit horizontal-driving signals in a the horizontal CCD that receives the vertically transmitted image signals from each row in the pairs of adjacent rows, and outputs the received image signals for each row.

During a first field phase, the vertical CCDs vertically transmit both of two (a first pair of) vertically adjacent rows of photodiode charges, and during a second field phase, the vertical CCDs vertically transmit a second pair or neighboring rows. The first pair and second pair of vertically adjacent rows may be adjacent to each other, or may be separated by a predetermined number of rows. The first field transmitted during the first field phase plus the second field transmitted during the second field phase form one frame.

During a first field phase, the vertical CCDs sequentially vertically transmit a first row of charges including a first color (e.g., green) signal and a second-color (e.g., red) signal and a second (adjacent to the first) row of charges including the first-color (e.g., red) signal and a third-color (e.g., blue) signal. During a second field phase, the vertical CCDs sequentially vertically transmit a third row of charges including a first-color (e.g., green) signal and a second-color (e.g., red) signal and a forth (adjacent to the third) row of charges including a first-color (e.g., green) signal and a third-color (e.g., blue) signal.

During the first field phase, a first column (vertical CCD) among the vertical CCDs vertically transmits a first- (e.g., green) signal and a second-color (e.g., red) signal, and a second (e.g. adjacent) column (vertical CCD) among the vertical CCDs vertically transmits a first-signal (e.g., green) and a third-color (e.g., blue) signal.

According to another aspect of the present invention, there is provided a method for driving an imaging device having a plurality of photodiodes arranged in a plurality of rows for converting filtered light into a plurality of charges and further having a plurality of (vertical) CCDs for (vertically) transmitting the plurality of charges, the method comprising the steps of:

receiving charges of photodiodes within two adjacent rows being a first pair of adjacent rows, and transmitting the charges. One of the pair of adjacent rows will include first-color (e.g., green) and second-color (e.g., red) signals (charges), and the other row in the pair will include first-color (e.g., green) and third-color (e.g., blue) signals (charges). Thus, all three colors (first, second, and third) and a whole field of a frame will be transmitted during one field phase so that signals from the photodiodes can be interpolated immediately without the need for a frame memory buffer. The second whole field of the frame can be transmitted and interpolated without the need for a frame memory buffer during the next field phase.

BRIEF DESCRIPTION OF THE DRAWINGS

The above and other features of the present invention will be understood by describing in detail exemplary embodiments thereof with reference to the attached drawings in which whenever the same element reappears in subsequent drawings, it is denoted by the same reference numeral.

DETAILED DESCRIPTION OF THE PREFERRED EMBODIMENTS

Figure 5:
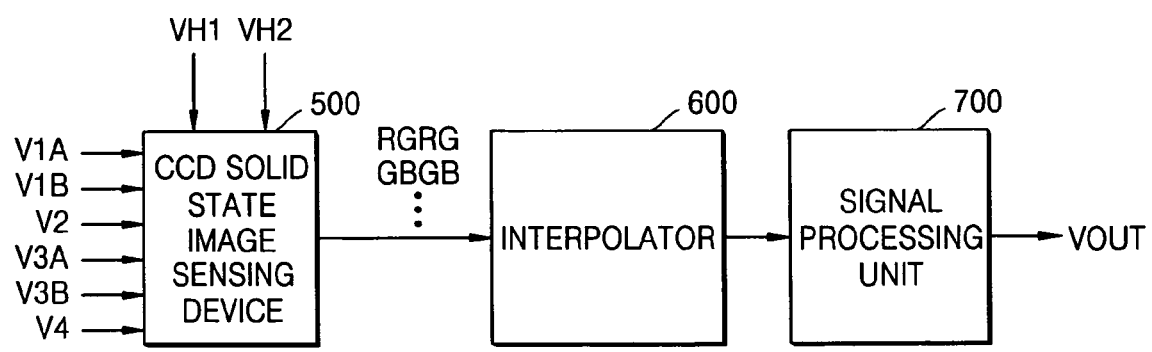
FIG. 5 is a block diagram showing a color image sensing system employing a CCD imaging device according to a preferred embodiment of the present invention.

FIG. 5 is a block diagram showing a color image sensing system employing a CCD based solid state image sensing device according to a preferred embodiment of the present invention. Referring to FIG. 5, the color image sensing system comprises a CCD solid state image sensing device 500, an interpolator 600, and a signal processing unit 700.

The solid state image sensing device 500 is a CCD-type image sensing device, and may be embedded in a mobile phone camera, a digital still camera and the like. The solid state image sensing device 500 takes pictures coming into view, converts the images into electric charges, and converts and outputs the charges as still or video image signals. The solid state image sensing device 500 senses external light by using photodiodes, converts the light into an electric signals, and outputs a still or video image signal. The photodiodes form a pixel array in the form of a 2-dimensional matrix.

The CCD-based imaging device 500, includes a large number of photodiodes (e.g. 260), serving as pixels, that are formed in a matrix, i.e., in rows and columns, on a semiconductor substrate. Also formed on the semiconductor substrate are vertical CCD arrays (VCCDs) (e.g., 570) each of which forms a vertical transfer path provided with transfer gates that transfer charges received from lines (rows) of photodiodes in the vertical direction. A horizontal CCD array (HCCD), serving as a horizontal transfer path, is formed along the direction of the rows of the photodiodes on the semiconductor substrate to transfer signal charges received from the vertical transfer paths on a line-by-line basis in the horizontal direction. CCDs containing a single row (array) of capacitors can be used as an analog voltage shift register. At regular intervals a command is given to each capacitor to transfer its charge to its neighbor. Thus the entire array is shifted by one location. This process is repeated, creating a signal at the output that is a delayed version of the input. CCDs with several rows of pixels shift the charge down in the fashion of a vertical shift register and the last row is read out in a horizontal shift register.

The solid state image sensing device 500 receives vertical driving signals (V1A, V1B, V2, V3A, V3B, and V4) for driving the vertical CCDs (VCCDs) and horizontal driving signals (VH1 and VH2) for driving the horizontal CCD (HCCD), and continuously outputs image signals of two adjacent rows of the pixel array. Thus, unlike the conventional method in which different image signal patterns of adjacent rows (one each of a first field and a second field that form one frame) are alternately output, the CCD solid state image sensing device 500 according to a preferred embodiment of the present invention outputs two neighboring rows at a time. Thus, image signals of an (R, G) row and of a (G, B) row, (one in each field) are output such that three-color signals (R, G, and B) are all output in a predetermined short period of time. Though it is assumed that the pixel array pattern is Bayer pattern here, the pixel array can be formed in a variety of ways and is not restricted to Bayer pattern. The solid state image sensing device 500 will now be explained in more detail.

Figure 1:
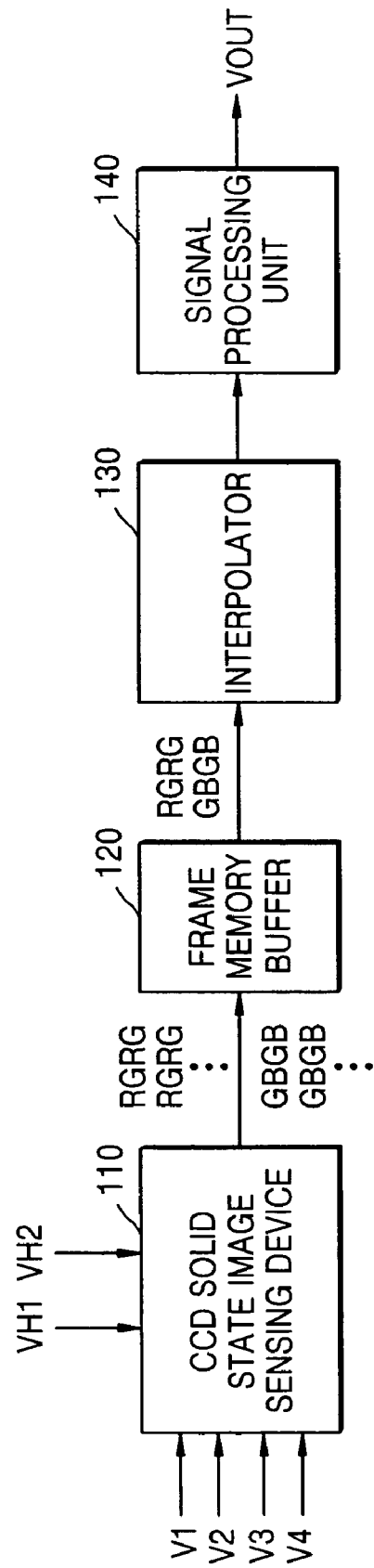
FIG. 1 is a block diagram of a color image sensing system employing conventional CCD imaging device.
Figure 2:
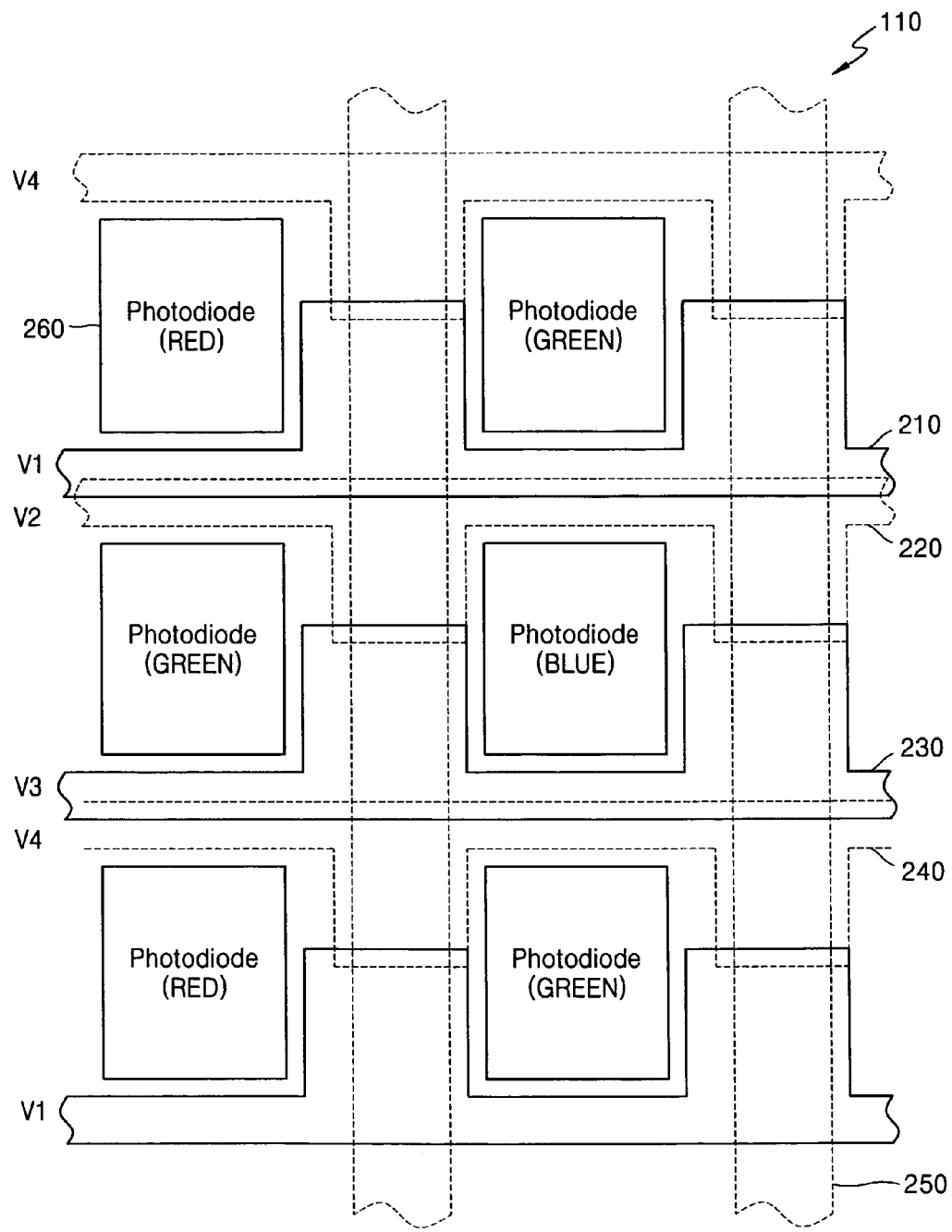
FIG. 2 is a diagram showing the pixel structure of the CCD imaging device of FIG. 1.
Figure 3:
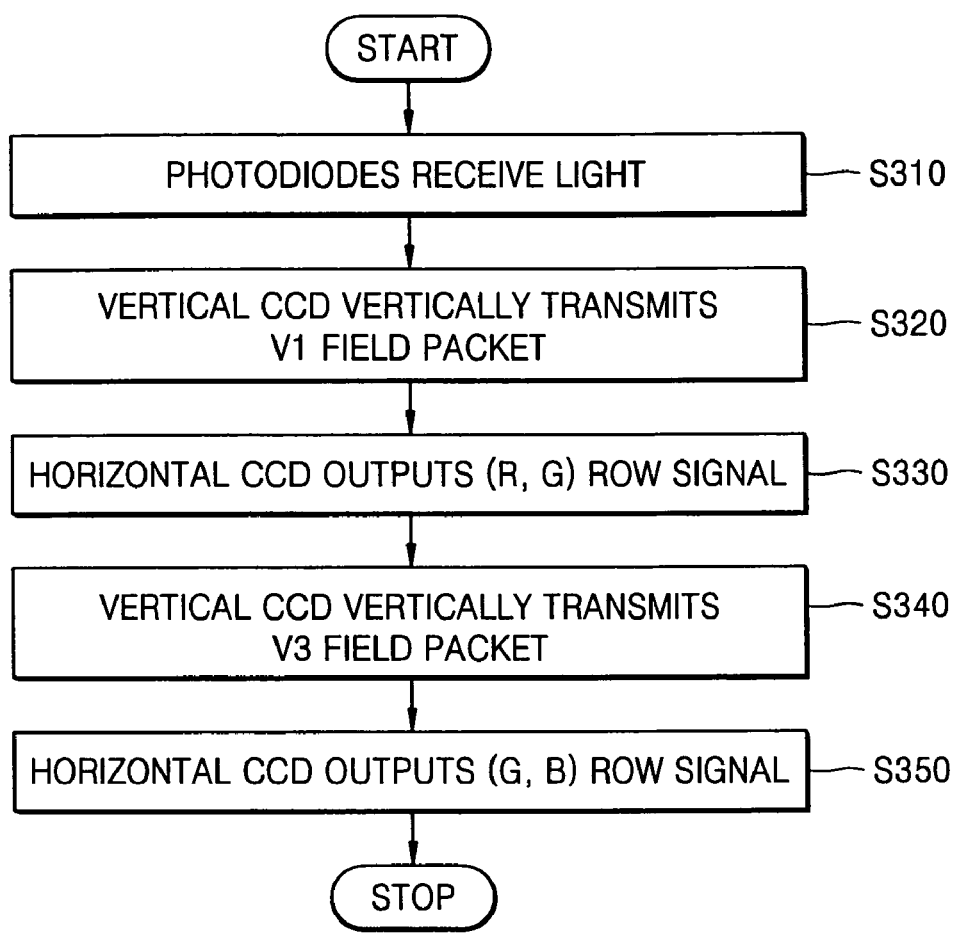
FIG. 3 is a flowchart of the steps explaining the operation of the CCD imaging device of FIG. 2.
Figure 4A:
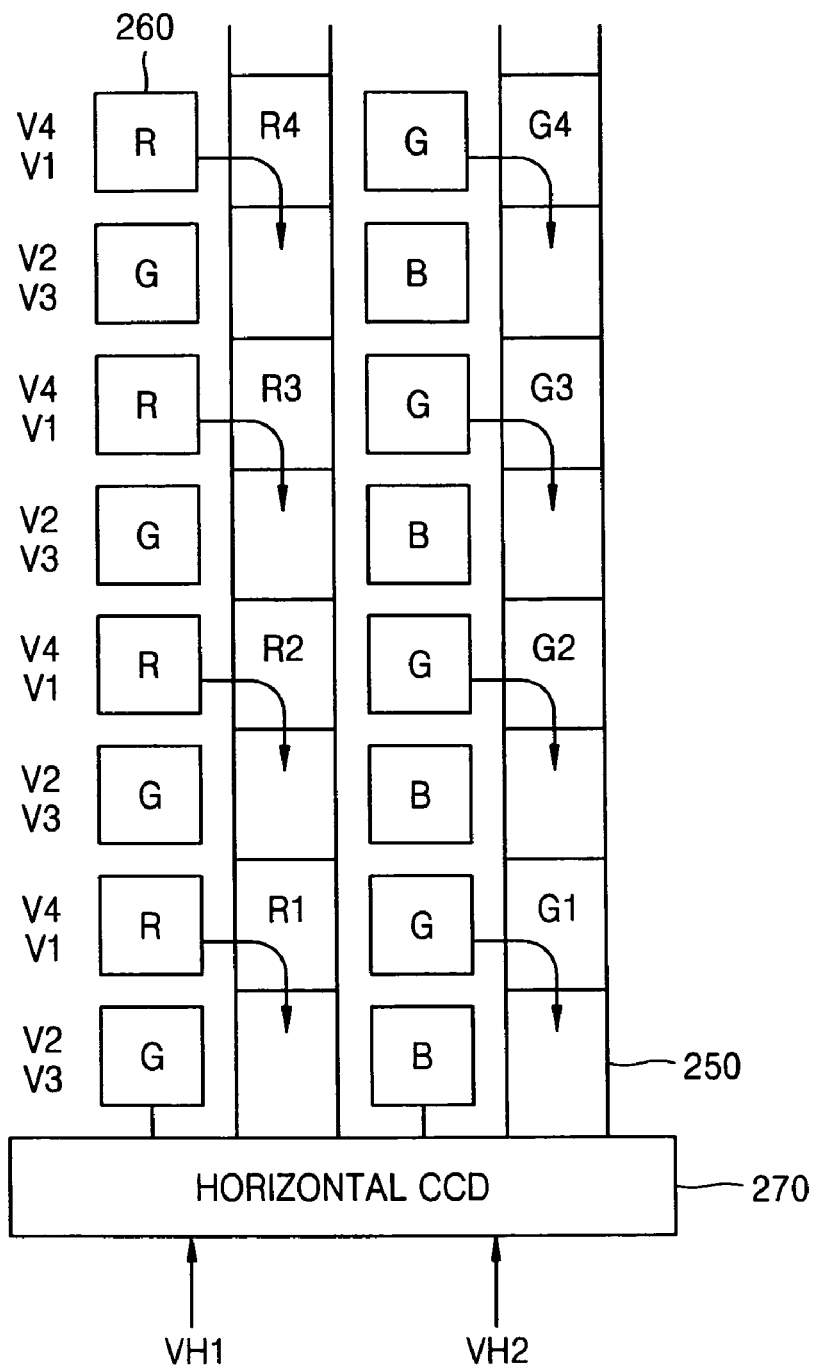
FIGS. 4a and 4b are detail diagrams for explaining the method of operation of the CCD image sensing device of FIG. 3.
Figure 4B:
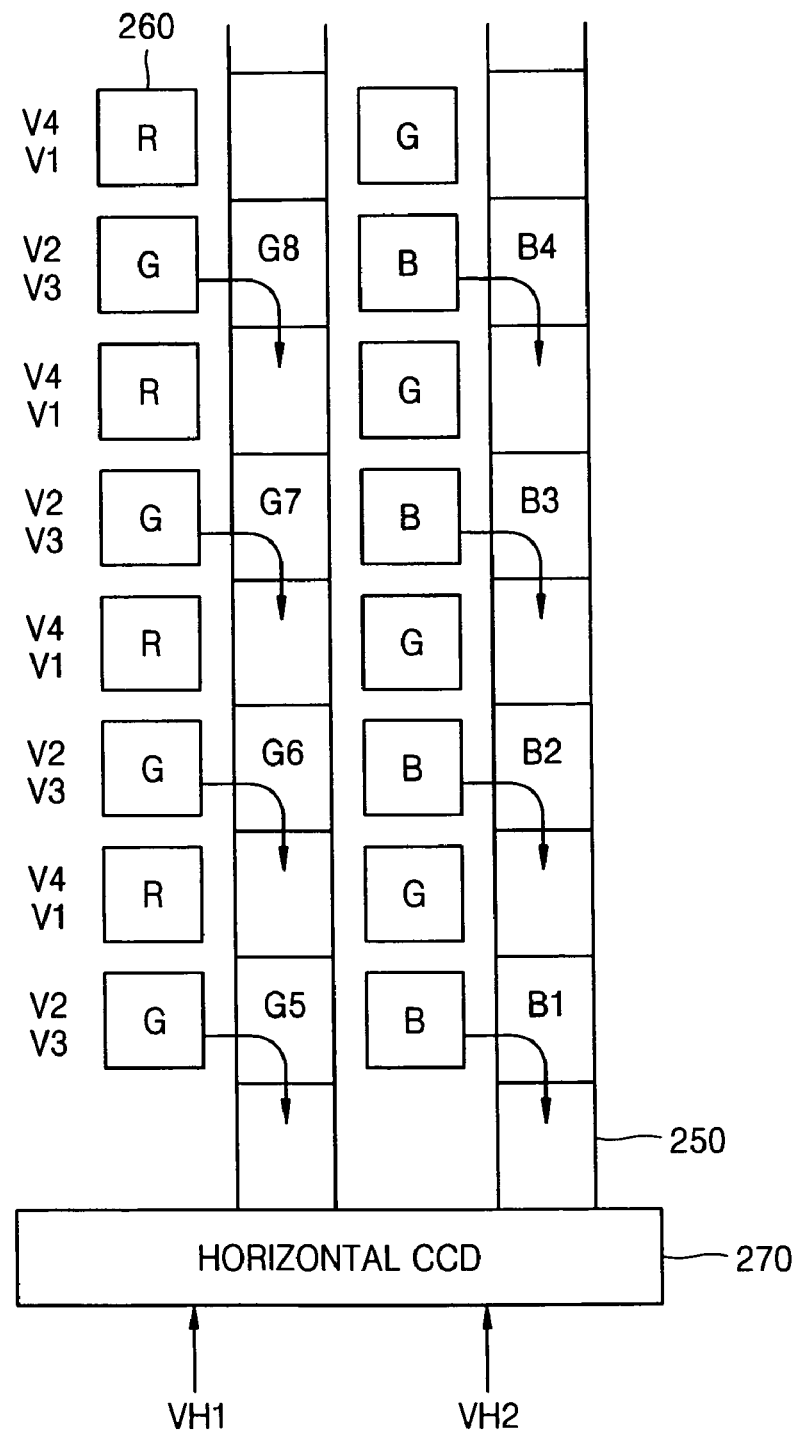

The interpolator 600 receives three-color signals (R, G, and B) output from two adjacent rows of photodiodes in the solid state image sensing device 500 at the same time, and performs interpolation. The interpolated three-color signals (R, G, and B) are output to a display apparatus, such as a liquid crystal display (LCD), through the signal processing unit 700. Thus, the solid state image sensing device 500 does not output all image signals of respective rows on the pixel array in one field period, but rather, the solid state image sensing device 500 divides the rows into two fields, and continuously outputs video signals of 2 rows that are predetermined rows distant away from 2 rows, each 2 rows formed by neighboring (R, G) row and (G, B) row. Accordingly, in order to perform interpolation of three-color signals (R, G, and B), the interpolator 600 may include a line memory, a minimum memory for storing one row of image signals from the pixel array. Also, the line memory storing the three-color signals (R, G, and B) may be disposed outside of the interpolator 600. This means requires a much smaller memory capacity than in the conventional method of FIG. 1 which requires a memory buffer capable of storing one whole frame or one whole field of image signals from the pixel array.

Figure 6:
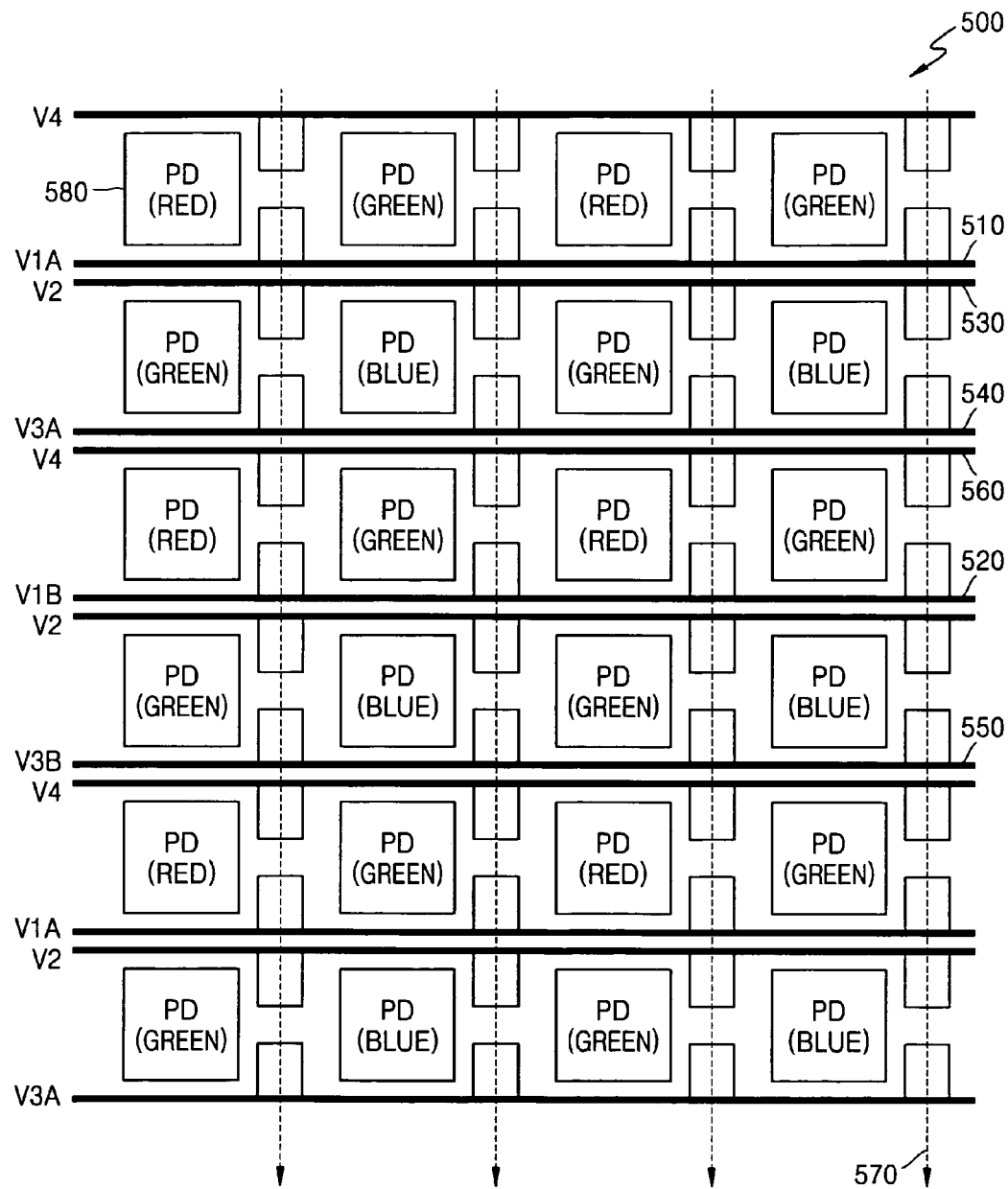
FIG. 6 is a diagram showing the pixel and vertical CCD structure of the CCD imaging device of FIG. 5.

FIG. 6 is a diagram showing the pixel structure of the CCD based solid state image sensing (imaging) device 500 of FIG. 5. Referring to FIG. 6, the solid state imaging device 500 of FIG. 5 comprises a plurality of photodiodes PD (e.g. 580) and a plurality of vertical CCDs (VCCDs) (e.g., 570). An image signal output from the plurality of vertical CCDs (e.g., 570) is transferred to a horizontal CCD (HCCD) 590 as shown in FIGS. 8a through 8d. In FIG. 6, electrodes 510 through 560 transmit signals (V1A, V1B, V2, V3A, V3B, and V4) for driving the vertical CCDs (VCCDs) 570 are shown separated between the photodiodes (e.g., 580), it is assumed that the electrodes are overlapping each other in internally different layers as is well known to persons skilled in the art, in order to vertically transmit charges transferred from the photodiodes (e.g. 580). The photodiodes (e.g., 580) are disposed in a two-dimensional matrix of a pixel array as in the conventional array, and sense light, and convert the light into electric signals, and generate image signals. It is assumed that a Bayer pattern color filter array is disposed on the top of the plurality of photodiodes (e.g., 580) forming the pixel array as described above. By using vertical driving electrodes 510 through 560 for transmitting vertical driving signals (V1A, V1B, V2, V3A, V3B, and V4), the vertical CCD (VCCDs) 570 receive image signals sensed in the photodiodes 580, and output the image signals to the horizontal CCD (HCCD) 590 through vertical (parallel) transmission. By using horizontal driving electrodes (not shown) transmitting the horizontal driving signals (VH1 and VH2), the horizontal CCD (HCCD) 590 outputs image signals for respective rows through horizontal (serial) transmission. The operations of the vertical CCDs (VCCDs e.g., 570) and the horizontal CCD (HCCD) 590 will be explained in more detail in explanation of FIG. 7.

Figure 7:
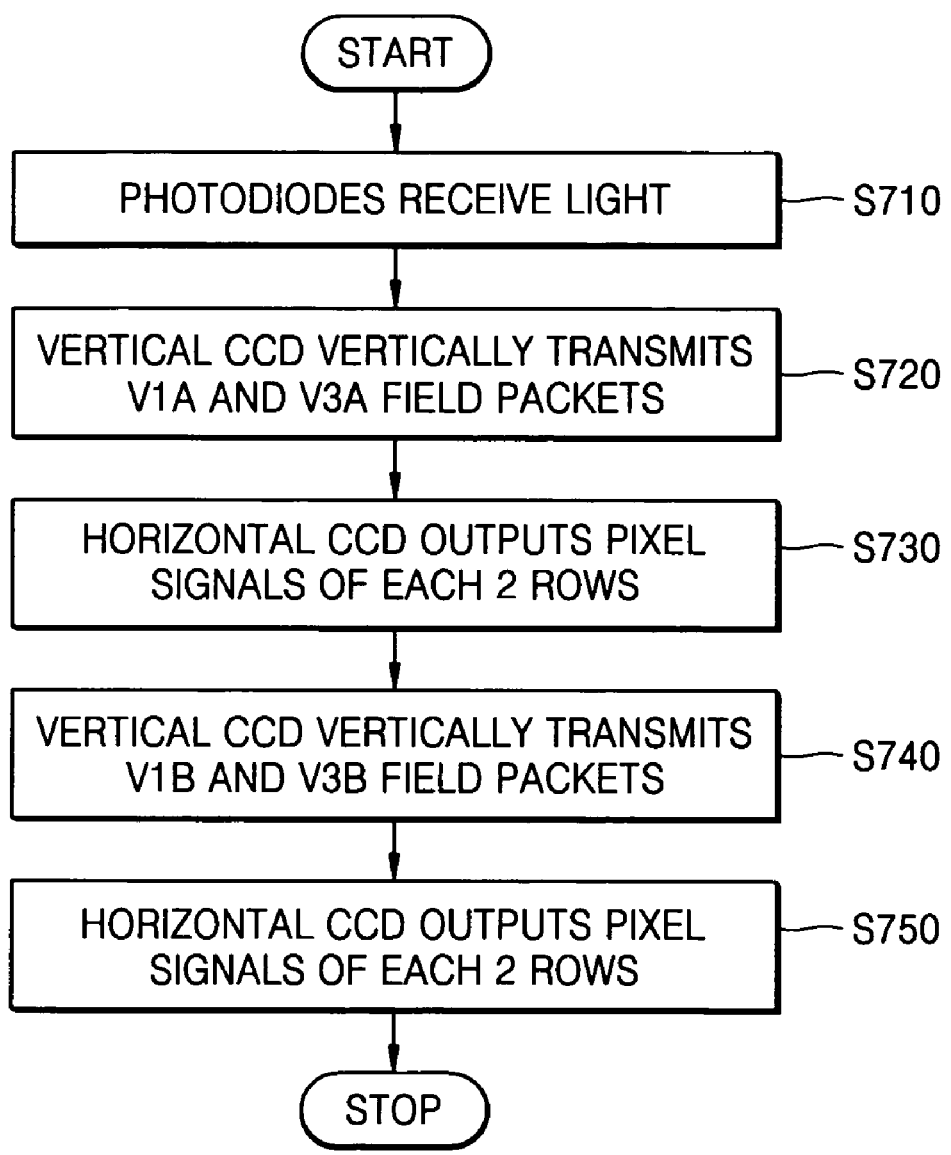
FIG. 7 is a flowchart of the steps of the method of operation of the CCD imaging device of FIG. 6.
Figure 8A:
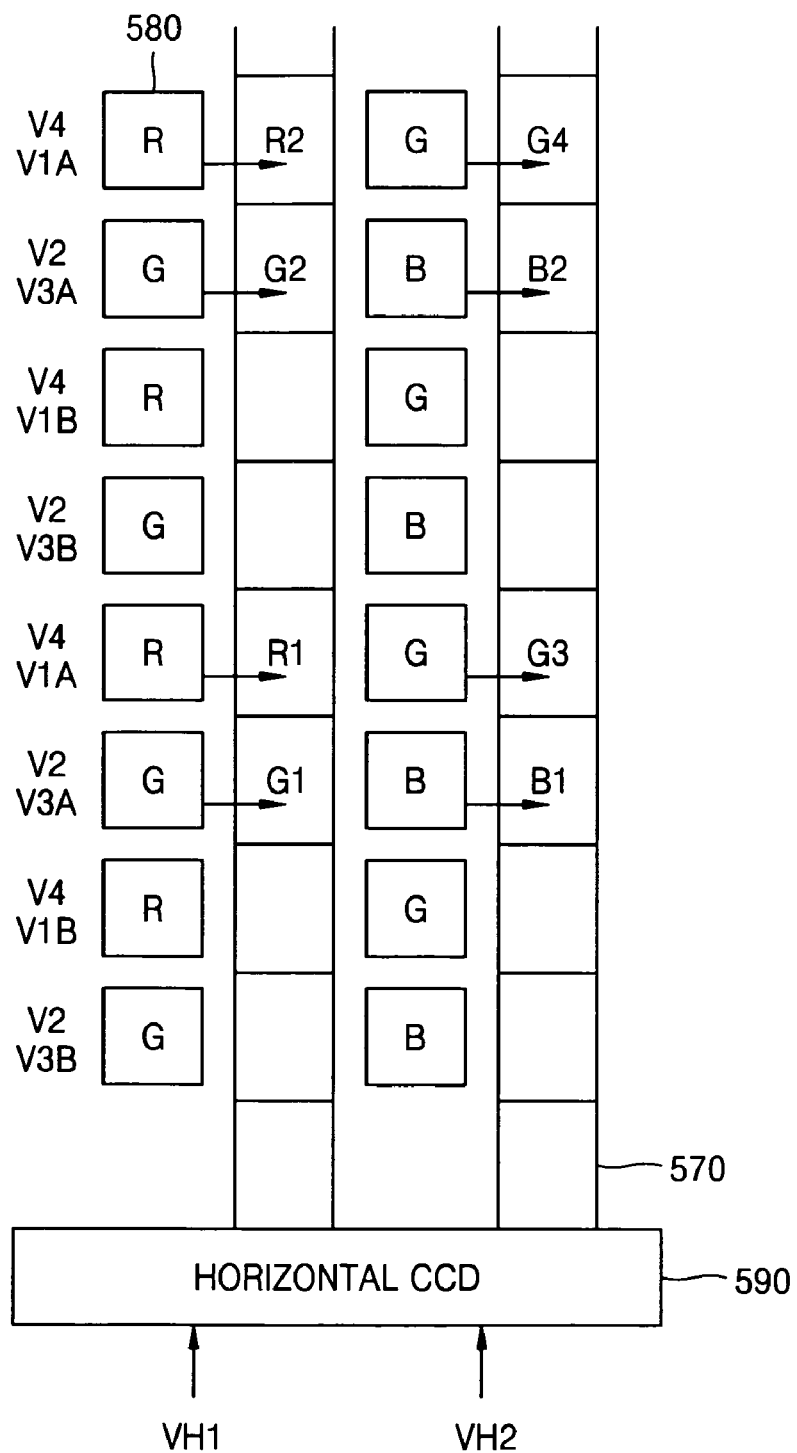
FIGS. 8a through 8d are detail diagrams for explaning the method of operation of the CCD imaging device of FIG. 6.
Figure 8B:
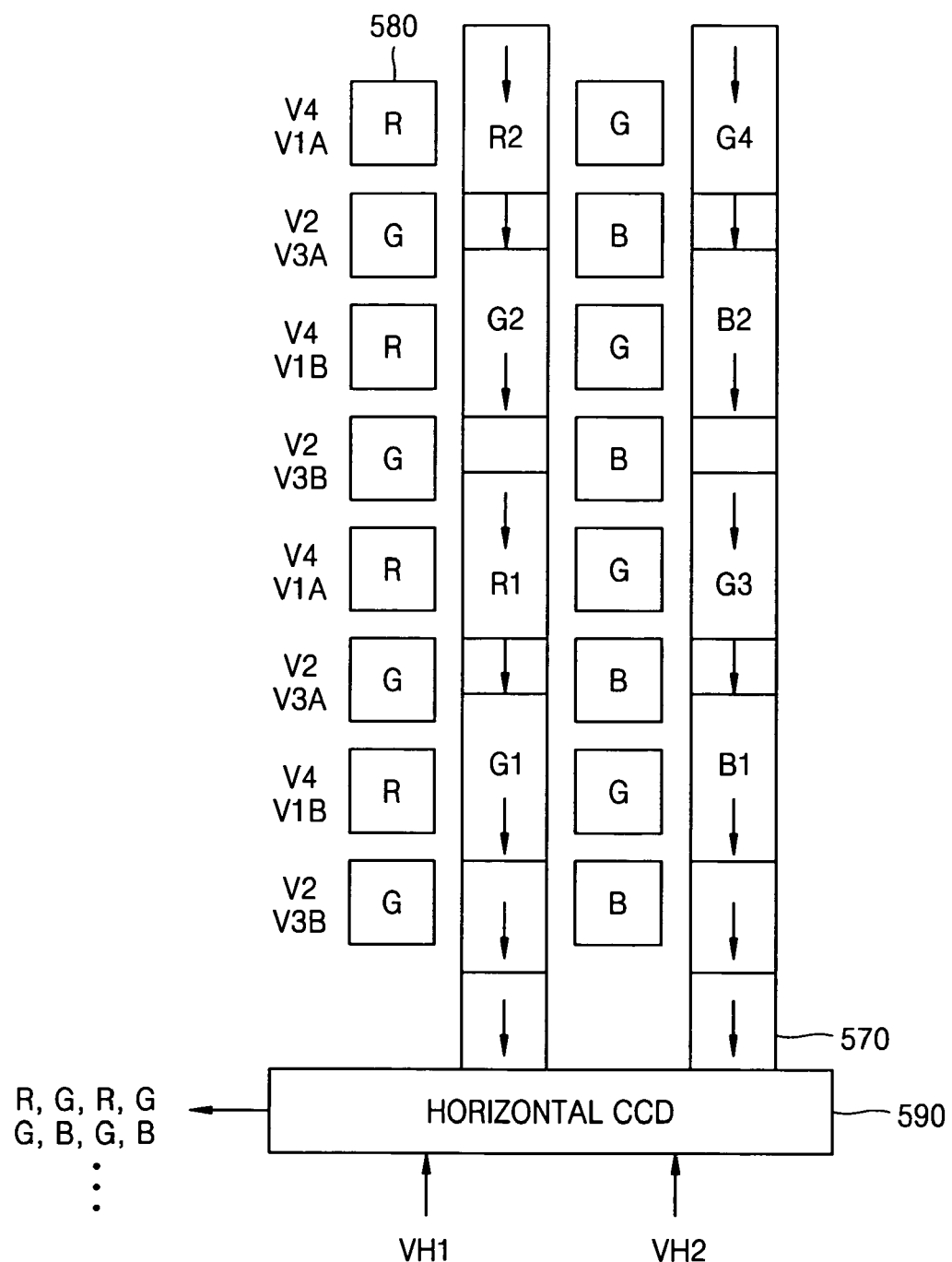

FIG. 7 is a flowchart explaining the of the steps of operation of the solid state image sensing device 500 of FIG. 6. FIGS. 8a through 8d are diagrams to further help to explain of the operation of the solid state image sensing device 500 of FIG. 6. In step S710 (FIG. 7) the mechanical shutter (not shown) is opened for a predetermined time so that signal charges corresponding to light falling upon the pixels is accumulated in the photodiodes PD (e.g., 580). Next, in the first field, if an active signal for readout is applied to driving electrodes 510 and 540 transferring V1A and V3A among vertical driving signals (V1A, V1B, V2, V3A, V3B, and V4), then image signals of predetermined rows, e.g., an (R, G) row and a (G, B) row, are transferred by the photodiodes 580 to the vertical CCD 570. In step S720 field packets V1A and V3A (shown in FIGS. 8a and 8b) thus transferred to the vertical CCD (VCCD) (e.g., 570) are vertically transmitted in the vertical CCDs (VCCDs, e.g., 570) in units of rows, towards the horizontal CCD (HCCD) 590, by vertical driving signals (V1A, V1B, V2, V3A, V3B, and V4). Referring to FIGS. 8a and 8b, field packet V1A comprises image signals that form (R, G) rows R1, G3, ..., R2, G4, ...; while field packet V3A comprises image signals that form (G, B) rows, e.g., G1, B1, ..., G2, B2, ...

Figure 9:
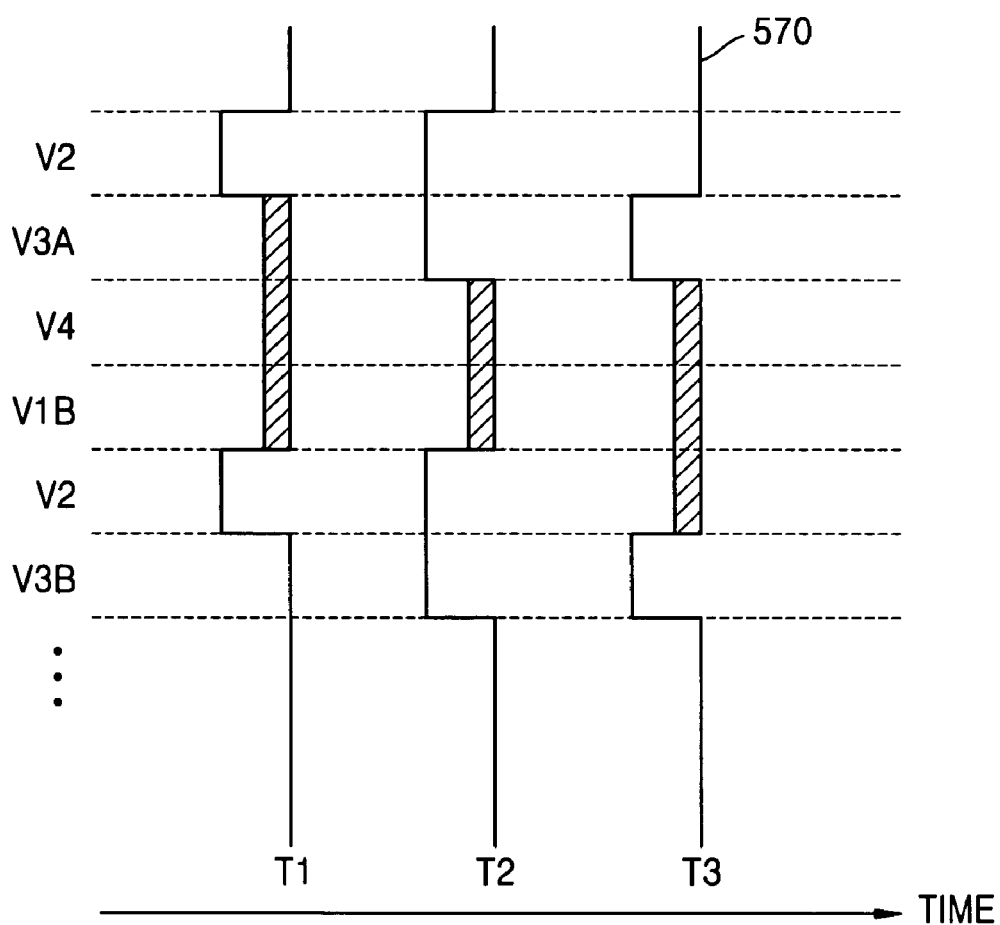
FIG. 9 is a timing diagram for explaining a method of vertically transmitting a charge packet in the CCD imaging device of FIG. 6.

FIG. 9 is a timing diagram for explaining the method of vertical transmission of an electric charge packet of the CCD solid state image sensing device 500 of FIG. 6. FIG. 9 shows an example in which the vertical CCD (VCCD) 570 vertically transmits an electric charge within an to image signal (e.g., G2 of FIG. 8a ) by pulsing vertical driving signals (V1A, V1B, V2, V3A, V3B, and V4). The method for transmitting an electric charge packet of a CCD-based solid state image sensing device is well known and therefore will not be explained in detail here.

In the first field, two active (e.g., in a second logic state, a "high" logic level) vertical driving signals V1A and V3A (among vertical driving signals V1A, V1B, V2, V3A, V3B, and V4) are asserted on driving electrodes 510 and 540 (see FIG. 6) for transmitting vertical driving signals V1A and V3A, and vertical driving signal V2 (see FIG. 6 or FIG. 8a ) is not activated and therefore assert a signal in a first logic state (a "low" logic level). Even though pixels corresponding to video signals G2 and R2 are adjacent to each other, because of vertical driving signal V2 between them is inactive, the charges corresponding to video signals G2 and R2 are not mixed together, and can be vertically transmitted as distinct charges.

FIG. 9 shows an time-charge diagram showing vertical driving signals (V1A, V1B, V2, V3A, V3B, and V4) while an electric charge corresponding to image signal G2 is being vertically transmitted, and illustrating the vertical movement of that signal charge. The signal charges of predetermined pairs of rows (e.g., of a first (R, G) row image signal and an adjacent second (G, B) row image signal), is selectively transferred from photodiodes 580 to the vertical CCDs (e.g. 570). Then, at time T1, vertical driving signal V2 is not activated, and vertical driving signals V3A, V4, and V1B are activated, so the electric charge corresponding to video signal G2 is distributed under the electrodes/gates of vertical driving signals V3A, V4, and V1B (e.g., under electrodes 540, 560, and 520 respectively, see FIG. 6). At time T2, only vertical driving signals V4 and V1B are activated, so the signal charge (of G2) is confined (and distributed) under electrodes 560 and 520 where active signals V4 and V1B are asserted. At time T3, vertical driving signals V4, V1B, and V2 are activated, and so the signal charge (of G2) is distributed under electrodes 560, 520, and 530 which assert active signals V4, V1B, and V2 respectively. The signal charge (of G2), having been transferred to the vertical CCD 570 from photodiodes 580, is thus vertically transmitted down to the horizontal CCD 590 by repeating this method.

Thus, in the first field, each vertical CCD (e.g., 570) receives distinct image signal charges from two neighboring (vertically adjacent) rows and each pair of adjacent rows is predetermined to be separated from other pairs of adjacent rows. Then, each vertical CCD (e.g., 570) vertically transmits the image signals. Each of the vertical CCDs (e.g., 570) sequentially vertically transmits a pair of distinct image signal charges. A first set of vertical CCDs vertically transmits charges of a first color (green) (e.g., G1 and G2) and charges of a second color (red) a signal (R1 and R2) having from respective rows among pairs of neighboring rows. A second set of vertical CCDs vertically transmits the charges of t a third color (blue) (e.g., B1 and B2) and charges of the first color (green) (e.g., G3 and G4). The charges of the first color (green), the second color (red), and the third color (blue) conform to a Bayer pattern representation of a line of pixels in a first field.

The horizontal CCD 590 receives the charges from pairs of adjacent rows associated with (starting under) vertical driving signals V1A and V3A, and then horizontally transmits (by horizontal driving signals VH1, and VH2), and alternately outputs a first (R, G) row image signal and a second (G, B) row image signal. The method for horizontally transmitting electric charge of the horizontal CCD 490 is similar to the method described referring to FIG. 9 and is well known to persons skilled in the art, and therefore a detailed explanation thereof will be omitted here.

Figure 8C:
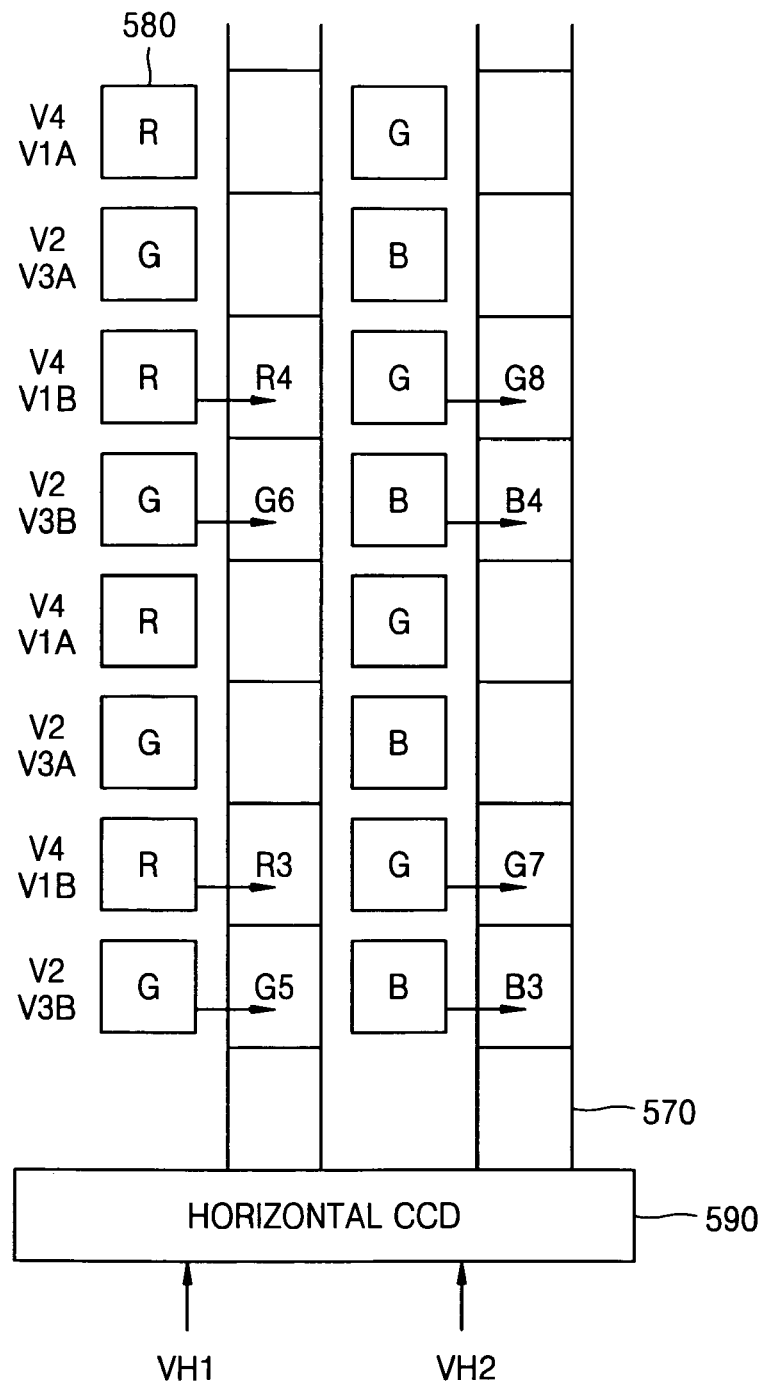
Figure 8D:
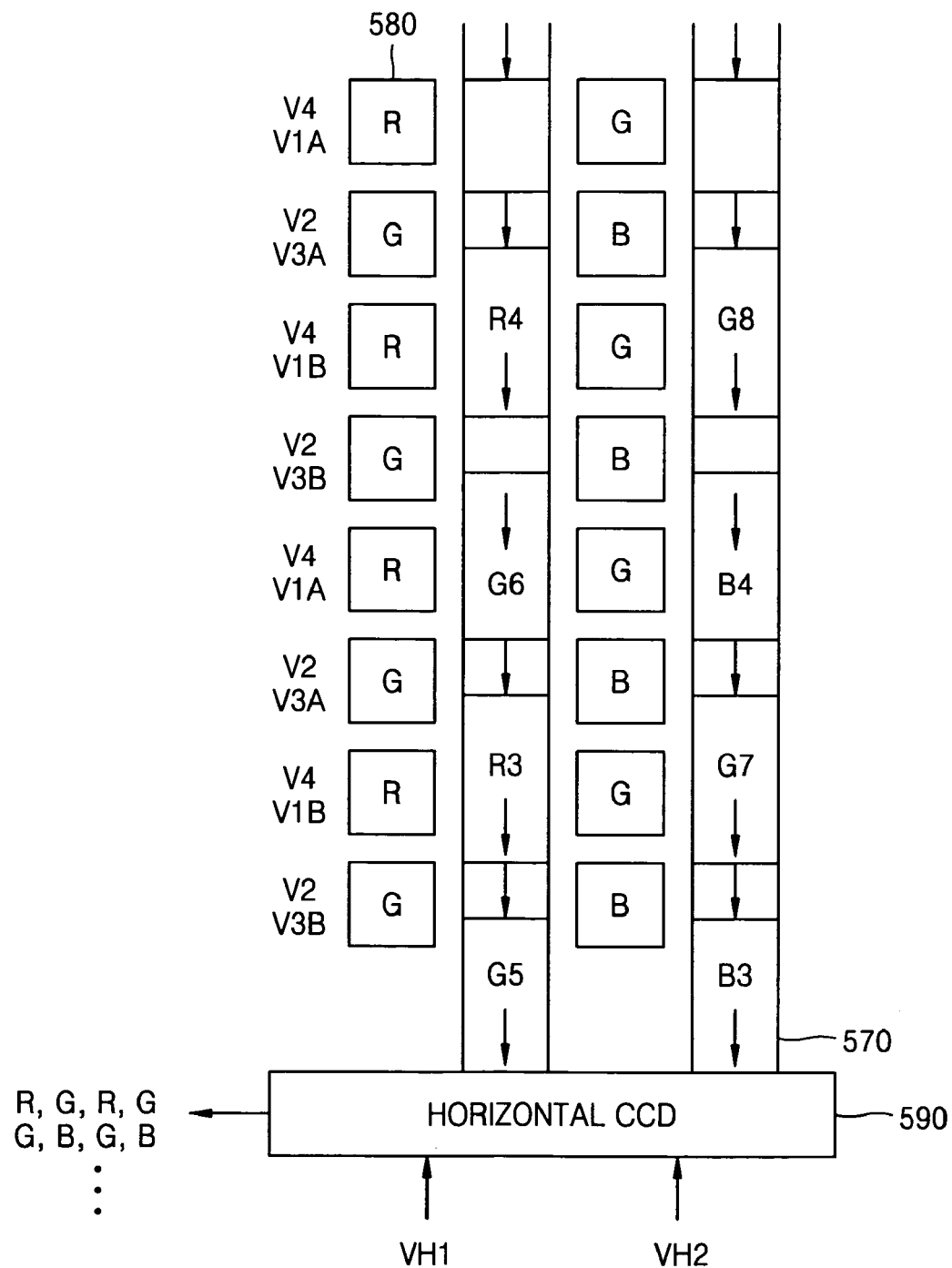

Likewise, in the next (second) field period, vertical driving signals V1B and V3B are active and are applied to driving electrodes 520 and 550, such that image signals of predetermined pairs of adjacent rows, for example, a third (R, G) row and fourth (G, B) row, are selectively transferred by the photodiodes 580 to the vertical CCD 570. The charges in adjacent rows under the electrodes (520 and 550) asserting vertical driving signals V1B and V3B (refer to FIGS. 8c and 8d) are thus transfer to the vertical CCDs (e.g., 570) and are vertically transmitted in pairs of rows, towards the horizontal CCD 590 via the vertical CCDs (e.g., 570), by repeatedly asserting the vertical driving signals (V1A, V1B, V2, V3A, V3B, and V4) in step S740. Referring to FIGS. 8c and 8d, signal V1B transfers a third plurality of rows of image signal charges (e.g., R3, G7, ..., R4, G8,) that form (R, G) rows, while vertical driving signals V3B transfers a fourth plurality of rows of image signal charges (e.g., G5, B3, ..., G6, B4) that form (G, B) rows.

Also in the second field, the vertical CCDs (e.g., 570) receive image signals of pairs of adjacent rows and each pair of adjacent rows is separated from the other pairs of adjacent rows, and vertically transmits the image signals. Although it is here assumed that each pair of adjacent rows is two rows distant from the next pair of adjacent rows, in alternative embodiments, each pair of adjacent rows can be separated by a multiple m of 2 rows, such as for example by 4 (m×2) rows, or by 6 (m×3) rows distant from other pairs of adjacent rows. In such alternative embodiments, the vertical CCD 570 can be provided additional driving electrodes or switches for asserting vertical driving signals in addition to the vertical driving signals (V1A, V1B, V2, V3A, V3B, and V4) so that the vertical CCDs (e.g., 570) can receive and vertically transmit image signals of row pairs separated by more than two rows. However, when the wiring complexity is considered, the most preferable embodiment is that the vertical CCDs (e.g., 570) receive and vertically transmit image signals of adjacent pairs rows that are separated by two rows.

Also in the second field, the vertical CCDs (e.g. 570) sequentially vertically transmit (through the first set of columns), a first row image signal including the first color (green) (e.g., G5 and G6) and the second color (red) (e.g., R3 and R4) in respective adjacent rows among the active pairs of adjacent rows. And the vertical CCDs (e.g. 570) sequentially vertically transmit (through the second set of columns), a third row image signal including a third color (blue) (e.g., B3 and B4) and a fourth row image signal including the first color (green) (e.g., G7 and G8). Here, the signals of the first color (green), the second color (red), and the third color (blue) also conform to a Bayer pattern representation of a line of pixels in a second field.

Also in the second field, the horizontal CCD 590 receives the image signals (charges) associated with the electrodes asserting vertical driving signals V1B and V3B (image signals a pair of adjacent rows), and horizontally transmits the image signals (using horizontal driving signals VH1, and VH2), and thus alternately outputs first active row image signal (R, G) and a second active row image signal (G, B). The horizontal CCD 590 receives a first field comprising three-color image signals, and then receives a second field of three-color image signals. The first and second fields form one frame which represents one photo on a display apparatus. A display apparatus (e.g., having a smaller resolution than the CCD array) can display one field of one photo without having to wait for the output of the second field.

As described above, unlike the conventional vertical CCD driving method by which three-color signals required by the interpolator are output separated into two fields, the CCD-based solid state image sensing (imaging) device 500 according to the preferred embodiment of the present invention continuously outputs field that each comprise all three colors. A first field alternately transmits a plurality of first (R, G) row image signal packets and a plurality of adjacent second (G, B) row video signal packets sensed by the photodiodes (e.g., 580) according to a modified vertical CCD driving method. Accordingly, still or video image signals can be processed (interpolated), e.g., for driving a display apparatus, without a frame memory buffer.

As described above, since the solid state image sensing device according to the present invention continuously outputs three color signals within each field of the frame, a frame memory buffer for driving a display apparatus is not necessary and accordingly, a small-sized thin system, such as a mobile phone camera and a digital still camera, can be implemented with a relatively lower cost.

In alternative embodiments of the invention, the horizontal CCD (590) can be eliminated and replaced with an interpolator adapted to receive two adjacent rows (lines) of image signals (charges) in parallel instead of in serial fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An imaging device comprising:
    a plurality of photodiodes for converting received light into electric charges and being arranged in a 2-dimensional matrix including a first row, a second row, a third row and a fourth row of photodiodes, wherein the first row of photodiodes is adjacent to the second row of photodiodes, and wherein the third row of photodiodes is adjacent to the fourth row of photodiodes;
    a plurality of vertical charge coupled devices (CCDs) for receiving charges from a first pair of adjacent rows of photodiodes, and for vertically transmitting the charges received from the first pair of adjacent rows of photodiodes at the same time during a first field phase,
    wherein the plurality of vertical charge coupled devices (CCDs) are adapted to vertically transmit charges received from second pair of adjacent rows of photodiodes at the same time during a second field phase; and
    a single horizontal CCD for receiving the vertically transmitted charges from the first pair of rows at the same time and the second pair of rows at the same time, and for outputting the received vertically transmitted charges.

2. The imaging device of claim 1, wherein the horizontal CCD outputs the received charges to an interpolator.

3. The imaging device of claim 1, wherein the first pair of adjacent rows is adjacent to the second pair of adjacent rows.

4. The imaging device of claim 1, wherein the first pair of adjacent rows is separated from the second pair of adjacent rows by predetermined number of rows.

5. The imaging device of claim 4, wherein the predetermined number of rows is two rows.

6. The imaging device of claim 4, wherein the predetermined number of rows are rows is a multiple m of 2.

7. The imaging device of claim 1, wherein a first field vertically transmitted by the plurality of vertical CCDs includes the first and second adjacent rows, and a second field vertically transmitted by the plurality of vertical CCDs includes the third and fourth adjacent rows, wherein the combination of the first and second fields constitute one frame.

8. The imaging device of claim 1, wherein a first field vertically transmitted during a first field phase by the plurality of vertical CCDs includes the first and second adjacent rows.

9. The imaging device of claim 8, wherein a second field vertically transmitted during a second field phase by the plurality of vertical CCDs includes the third and fourth adjacent rows, wherein the combination of the first and second fields constitute one frame.

10. The imaging device of claim 1, wherein during a first field phase, the vertical CCDs vertically transmit signals including a first color, a second color, and a third color from the first pair of adjacent rows, and during a second field phase, the vertical CCDs vertically transmit signals including the first color signal, the second color signal, and the third color from the second pair of adjacent rows.

11. The imaging device of claim 4, wherein first, second and third color signals from the first pair of adjacent rows form a Bayer pattern.

12. The imaging device of claim 1, wherein during the first field phase, one of the vertical CCDs sequentially vertically transmits a third color signal and the first color signal, and during a second field phase, the same one of the vertical CCDs sequentially transmits the third color signal and the first color signal.

13. A method for driving an imaging device having a plurality of photodiodes arranged in a plurality of rows for converting filtered light into a plurality of charges and further having a plurality of CCDs for transmitting the plurality of charges, the method comprising the steps of:
    receiving charges of photodiodes within two adjacent rows forming a first pair of adjacent rows, and transmitting the charges at the same time to a horizontal CCD; and
    receiving charges of photodiodes within two other adjacent rows forming second pair of adjacent rows, and transmitting the charges at the same time to the same horizontal CCD.

14. The method of claim 13, wherein the charges received from photodiodes within two adjacent rows are vertically transmitted by the plurality of CCDs.

15. The method of claim 13, wherein the plurality of CCDs are a plurality of vertical CCDs charge-coupled to the plurality of photodiodes.

16. The method of claim 13, further comprising sequentially outputting the adjacent rows of charges to an interpolator.

17. The method of claim 13, further comprising interpolating a first pair of adjacent rows of charges.

18. The method of claim 13, wherein the second pair of adjacent rows is separated from the first pair of adjacent rows.

19. The method of claim 13, wherein the second pair of adjacent rows is adjacent to the first pair of adjacent rows.

20. The method of claim 14, wherein the vertical transmission comprises:

during a first field phase, vertically transmitting charges from each row of the first pair of adjacent rows; and during a second field phase, vertically transmitting charges from each row of the second pair of adjacent rows.

21. The method of claim 14, wherein the vertical transmission comprises:

during a first field phase, sequentially vertically transmitting a first color signal and a second color signal from the first pair of adjacent rows; and during a second field phase, sequentially vertically transmitting the first color signal and the second color signal from the second pair of adjacent rows.

22. The method of claim 21, wherein the vertical transmission comprises:

in the first field phase, sequentially vertically transmitting a third color signal and the first color signal through a selected one of the vertical CCDs, and in the second field phase, sequentially transmitting the third color signal and the first color signal through the same selected one of the vertical CCDs.

23. The method for driving a solid state image sensing device of claim 22, wherein the first through third color signals form Bayer patterns.

\* \* \* \* \*